Patented May 28, 1935

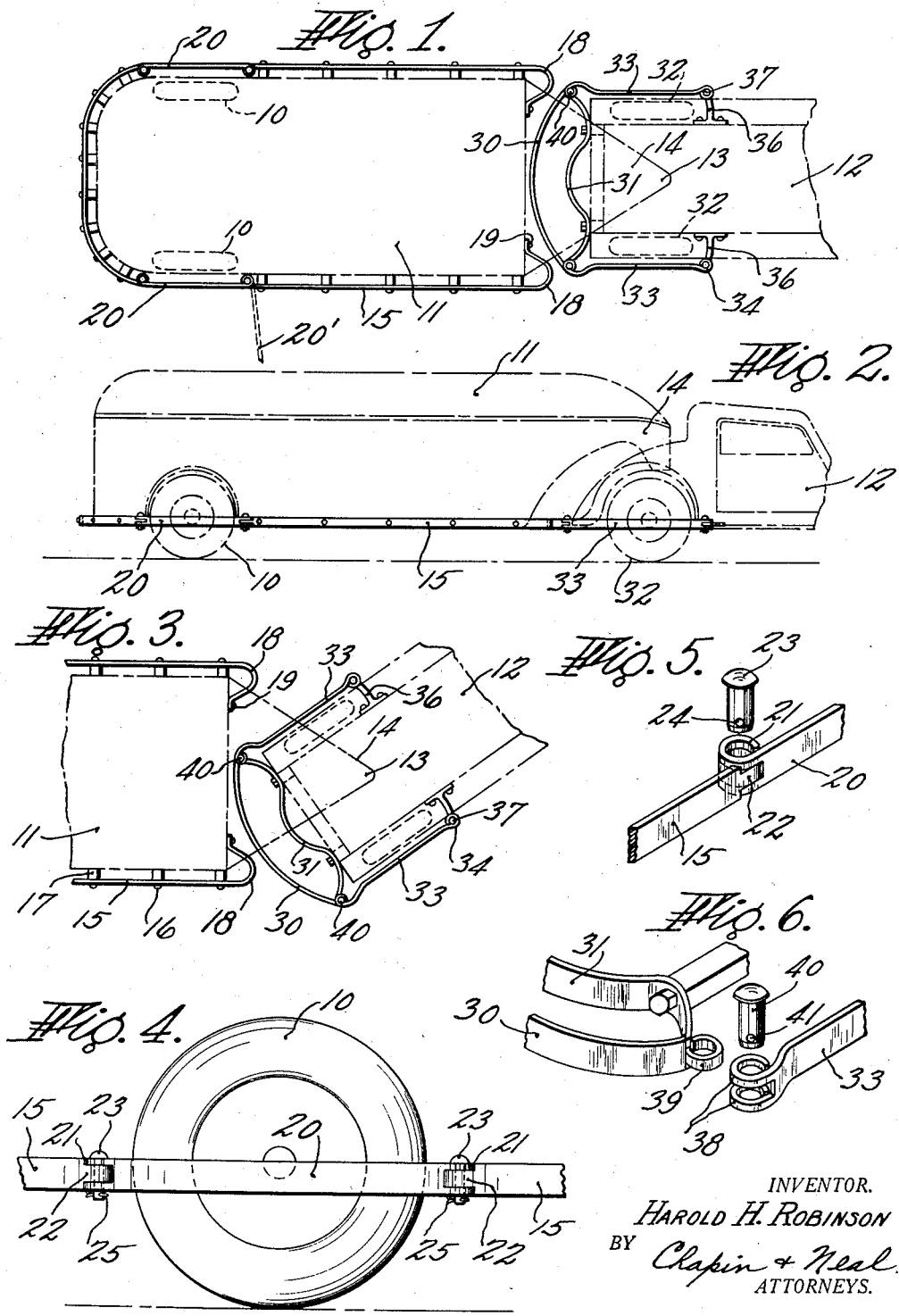
May 28, 1935.  H. H. ROBINSON  2,002,832
GUARD SYSTEM FOR TRACTOR TRAILER COMBINATIONS
Filed May 22, 1933
INVENTOR.
HAROLD H. ROBINSON
BY Chapin + Neal
ATTORNEYS.

2,002,832

UNITED STATES PATENT OFFICE 2,002,832

GUARD SYSTEM FOR TRACTOR-TRAILER COMBINATIONS

Harold H. Robinson, Opalocka, Fla., assignor to Curtiss Aerocar Company, Inc., Opalocka, Fla., a corporation of Florida Application May 22, 1933, Serial No. 672,133

1 Claim. (Cl. 293—55)

This invention relates to a guard rail or bumper system for protecting semi-trailers and their tow cars against injury. This combination of vehicles has presented problems in securing protection against side collisions which could not be solved by resorting to bumpers of usual design. One point of difficulty has been the varying angular relative positions assumed by the connected vehicles when turning a corner. With the bumper systems previously used at least one of the vehicles was unprotected when in this position.

It is one object of the present invention to provide a bumper or guard rail system for semi-trailers and tow cars which will furnish adequate protection for both vehicles at their junction no matter what angular positions the vehicles may assume. Another object is to protect the vehicles at the region of their junction in such a manner that hooking or locking of the bumpers of a colliding vehicle with either the tow car or the semi-trailer will be prevented. Another object is to provide a guard rail or bumper system which will present the appearance, when viewed from the side, of a continuous band joining and at least partially surrounding both vehicles. Another object is to provide completely or partially removable guard sections at the wheels of the vehicles so that wheels or tires may be changed without any interference from the guard rail system. Additional objects will appear from the following description and claim.

Referring to the drawing:

Fig. 1 is a top plan view of a semi-trailer and its attached tow car, illustrating one arrangement of guard rails and bumpers in accordance with this invention;

Fig. 2 is a side elevation thereof;

Fig. 3 is a detail corresponding to a portion of Fig. 1 but showing the tow car in a different angular position;

Fig. 4 is a detail, on an enlarged scale, showing the arrangement of the guard rail sections at one of the wheels;

Fig. 5 is a perspective detail of one of the joints shown in Fig. 4, with a connecting pin partially removed; and Fig. 6 is a perspective detail of the hinge arrangement of guard rails for wheels of the tow car.

The towed vehicle is in the drawing shown as of the semi-trailer type, having rear wheels 10 but no front wheels, and is indicated generically at 11. The tow car is shown at 12, being usually a passenger car of the coupé type with a detachable pivotal connection for the semi-trailer located in the place of the usual rumble seat. This connection need not be described in detail, the two cars having pivotal connection around a vertical axis at substantially the point 13, and the forward end of the semi-trailer having a wedge-shaped nose 14 to support this pivot.

Around the sides and rear of the semi-trailer is a guard rail or bumper 15, secured in place as by studs or rivets 16 and spacing collars 17. At its forward ends this guard rail has projections 18 formed upon comparatively wide curves, and is fastened to the forward end of the semi-trailer by bolts or rivets 19. All of the connections 16 and 19 may be made to the main frame sill of the semi-trailer so that the guard rail will have a solid support. The guard rail is preferably continuous except at the rear wheels 10, where its permanent presence would be undesirable because of interference with the removal of the wheels or tires. At these points the guard rail is preferably interrupted by a swinging or removable section 20, the ends of which are preferably formed as forked eyes 21 (Figs. 4 and 5). Between the branches of these eyes a narrower eye 22 on the end of each adjacent guard rail system is adapted to fit, the two being joined together by a pin 23. By removing these pins the guard rail section 20 may be removed entirely. If it is desired to shift the section only partially out of the way one only of the pins may be removed, and the section swung to a position such as shown in 20' in Fig. 1. The pins 13 may have holes 24 formed in them for the reception of the usual cotter pins 25 or other fastening device.

For supporting the guard rail or bumper at the rear of the tow car a suitable bracket may be used. Since these cars come equipped with rear bumpers, however, provision has been made for employing these bumpers as a support for the rear guard rail carried by the tow car for co-operation with the guard rail system of the semi-trailer. In this case a guard rail 30 is welded to the normal tow car bumper 31 adjacent its ends. The guard rail 30 is curved upon an arc substantially concentric with the common axis of rotation of the tow car and semi-trailer, so that as the cars change their angular positions a substantially uniform distance is kept between the guard rail 30 at the exposed side of the tow car and the adjacent forward extension 18 of the guard rail 15. This effect is clearly indicated in Fig. 3. It will be noticed that even in this normally vulnerable angular position of the vehicles a substantially continuous guard rail system is maintained, and that no outstanding parts of the guard rails are left upon which the bumpers of colliding vehicles might catch.

Since the rear end of the tow car swings into an exposed position when the vehicles are rounding an abrupt curve, it is desirable to extend the guard rail system of the tow car to a sufficient extent to protect this vulnerable portion. At the same time this guard rail system must be so constructed as to permit access to the rear wheels 32 of the tow car. An arrangement generally similar to that used for the guard rail section 20 is preferably employed. The two removable guard rail sections 33 of the tow car are each formed on their forward ends with spaced eyes 34 between which extends an eye on a bracket 36 mounted on the tow car frame. A pin 37 extending through the aligned eyes makes the section 33 swingable or removable at this point. At its opposite end the section 33 is formed, as shown, with a double eye or clevis 38 mating with an eye 39 formed on the end of the bumper 31, or alternatively on the end of the guard rail 30. A pin 40 passes through the eyes 38 and 39 when aligned so as to hold the structure assembled. Both the pins 37 and 40 may be provided with holes 41 for the reception of cotter pins if desired.

It will be seen from the foregoing description that a guard rail system extending completely around the semi-trailer and the rear end of the tow car is provided, this guard rail system acting and appearing as a single unit although in fact formed in separate divisions on the two cars. This apparent unity will persist even though the cars are positioned at an angle as in Fig. 3. The joint between the semi-trailer and the tow car is particularly well guarded, irrespective of the angular position of the vehicles. Furthermore, a continuous guard rail system is provided which will permit ready access to the wheels of the semi-trailer and to the guarded rear wheels of the tow car when this is necessary. It will be understood that the broader outlines of the invention have been pointed out above, supplemented by a description of its details in a preferred form, and that the invention is not therefore confined to these specific details except as pointed out in the following claim.

What I claim is:

A guard rail system for a semi-trailer and its associated tow car, comprising a guard rail extending around the rear and sides of the semi-trailer and bowed inwardly at the forward end thereof, a guard rail extending around the rear end of the tow car and formed between the bowed portions of the first guard rail upon an arc having a center of curvature approximately at the pivot center of the tow car and semi-trailer and serving to protect the rear end of the tow car in all angular positions relative to the semi-trailer, said two main guard rails being interrupted adjacent the wheels of the semi-trailer and the rear wheels of the tow car, guard rail sections bridging the interrupted portions of the main guard rails, the main guard rails at the points of interruption and the ends of the guard rail sections being formed with cooperating eyes, and pins releasably holding said eyes in alignment.

HAROLD H. ROBINSON.